United States Patent [19] [11] 4,270,357
Rossi et al. [45] Jun. 2, 1981

[54] TURBINE CONTROL

[75] Inventors: Anthony J. Rossi, Leominster; Donald F. Behringer, Ashburnham, both of Mass.

[73] Assignee: General Electric Company, Lynn, Mass.

[21] Appl. No.: 83,345

[22] Filed: Oct. 10, 1979

[51] Int. Cl.³ ............................................. F01K 13/02
[52] U.S. Cl. ........................................ 60/660; 60/648
[58] Field of Search ................ 60/648, 654, 660, 677, 60/678; 290/40 R, 40 A, 52; 415/17

[56] References Cited

U.S. PATENT DOCUMENTS

| | | | |
|---|---|---|---|
| 2,977,768 | 4/1961 | Wagner et al. | 415/17 |
| 3,391,539 | 7/1968 | Dimitroff, Jr. et al. | 60/648 X |
| 3,971,219 | 7/1976 | Taylor et al. | 415/17 X |

Primary Examiner—Allen M. Ostrager
Assistant Examiner—Stephen F. Husar
Attorney, Agent, or Firm—James W. Mitchell

[57] ABSTRACT

Some power plants may produce both power and process steam as output products and may be referred to as cogeneration power plants. This type of power plant may include at least one extraction type steam turbine in order to conveniently output process steam. Sometimes the available power plant steam supply is insufficient to satisfy both load demand and process steam requirements whereupon it may be desirable to prefer load demand over process steam requirements. The present invention is a control system for electronically implementing that preference.

6 Claims, 2 Drawing Figures

TURBINE CONTROL

BACKGROUND OF THE INVENTION

The invention relates, in general, to control systems for prime movers and, in particular, to an electronic control system for an extraction type steam turbine.

The invention is applicable to cogeneration type power plants which output both power and process steam. This type of power plant may include several turbine-generator sets and at least one extraction steam turbine. U.S. Pat. No. 2,977,768 to Wagner and Straney issued Apr. 4, 1961 sets forth a basic electronic control system for an extraction type steam turbine. The patent describes two signal paths; i.e., a speed signal path and a pressure signal path which ultimately set the position of the turbine inlet valve and the extraction valve. The electronic signal paths are interconnected because the speed error signal modifies the pressure error signal and the pressure error signal modifies the speed error signal. This leads to the following result. If a change in turbine load causes a speed error, corrective action is taken by the inlet steam valve and the extraction steam valve moving in the same direction in order to maintain extraction pressure and flow constant. If on the other hand, a change in process steam requirement generates an extraction pressure error signal, the inlet valve and the extraction valve move in opposite directions to maintain constant speed and correct for the pressure error.

U.S. Pat. No. 3,391,539 to Dimitroff and Wagner describes a control system for a multiple turbine power plant which allocates and dispatches the flow of process steam in a pre-determined order of preference. The present invention differs from the Dimitroff et al patented invention in that process steam availability is subject to load requirements based upon inlet steam flow/pressure. The invention is directed to a control system which will automatically switch from a speed/extraction pressure control mode to an inlet header pressure/speed control mode in order to ensure that available inlet steam is used to satisfy the preferred load requirements rather than process steam requirements should the power plant inlet steam flow fall short of normal plant cogeneration requirements. The latter short fall could occur if a boiler were temporarily taken out of service.

U.S. Pat. No. 3,971,219 to Taylor and Finck shows a control system for an extraction type steam turbine wherein the turbine inlet valve is positioned to achieve maximum boiler performance and wherein the extraction valve maintains speed control for the turbine in accordance with the position of the inlet valve position. Extraction flow may be achieved by a supplemental boiler. The present invention differs in circumstance and control mechanism in that more than one steam demand is being considered and extraction pressure is controlled when there is available steam.

SUMMARY OF THE INVENTION

The purpose of the inlet pressure control is to assure that the throttle flow to the turbine is maintained at a level which does not drive the inlet pressure below a desired set point. The desired set point is comparable to the header pressure necessary to maintain a particular power output. In the event that a system malfunction should occur such that the header (inlet) pressure begins to drop below the desired set point, the control system will automatically switch from speed/extraction pressure control to inlet pressure/speed control mode.

The foregoing invention is practiced in a preferred form by sensing turbine speed, extraction pressure and throttle pressure. Under normal operating conditions, the throttle or inlet valve is controlled by a combination of the speed error signal and the extraction error signal whereas; likewise, the extraction valve position is controlled by the extraction error signal modified by the speed error signal. An electronic signal representative of the difference between the minimum throttle pressure and the actual throttle pressure is input into a pair of electronic gates such that when the actual throttle pressure falls below the preset minimum an electronic signal gates out the normal speed signal so that throttle valve position becomes a function of throttle pressure. On the other hand, the extraction valve is positioned by a combination signal representative of speed error and throttle pressure demand.

OBJECTS OF THE INVENTION

It is one object of the invention to provide an automatic electronic control system for an extraction steam turbine which can switch from speed/extraction pressure control to throttle pressure/speed control under certain predetermined conditions.

It is another object of the invention to provide a priority control system whereby throttle pressure control is preferred over extraction pressure control.

The novel features believed characteristic of the present invention are set forth in the appended claims. The invention itself, however, together with further objects and advantages thereof, may best be understood with references to the following description taken in connection with the drawings.

DETAILED DESCRIPTION OF THE INVENTION

Figure 1:
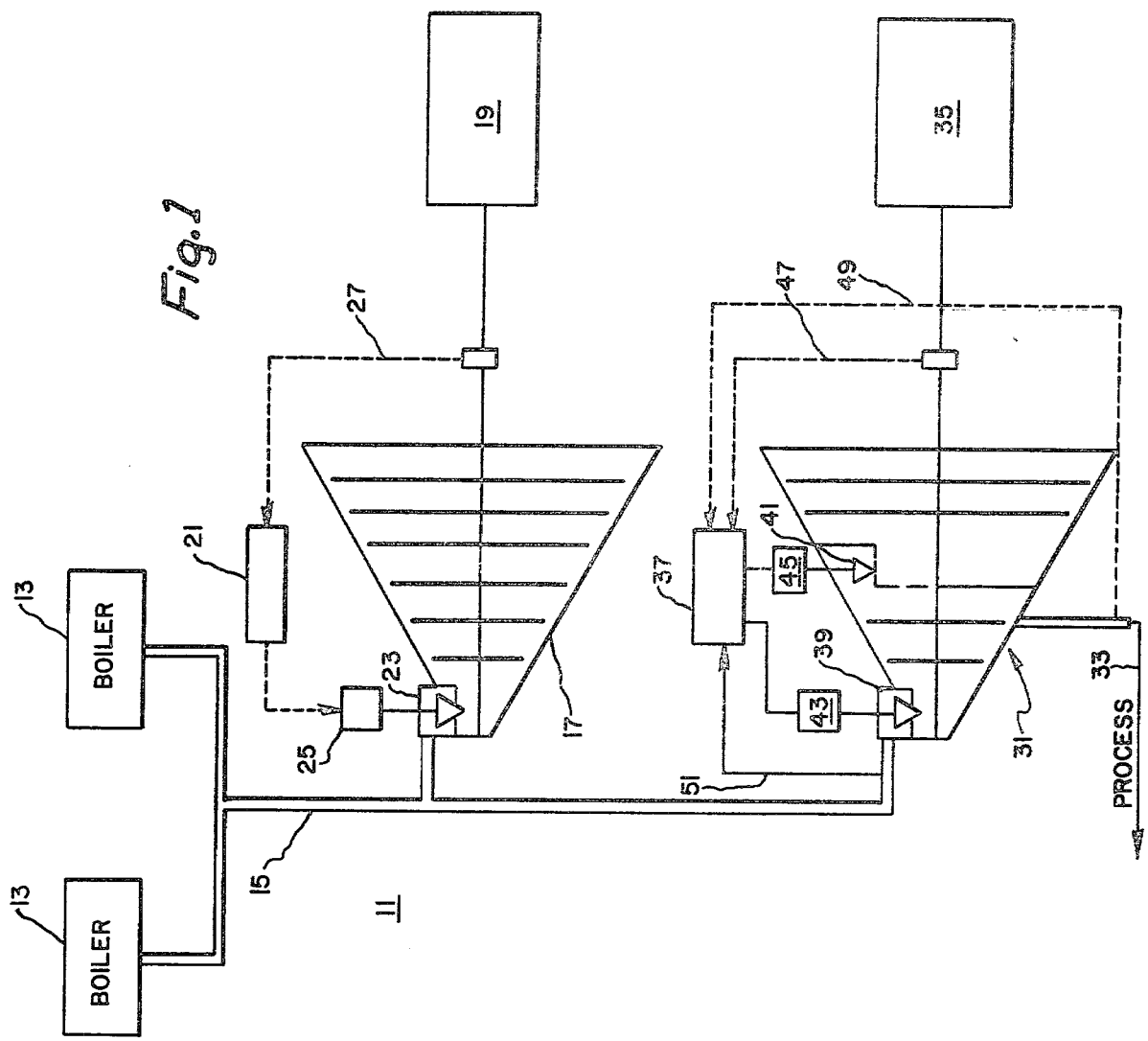
FIG. 1 is a line sketch of a power plant of the type wherein the present invention may be usefully practiced.

FIG. 1 presents a schematic diagram of a power plant 11 of the type in which the present invention may be advantageously utilized. A pair of steam generators or boilers 13 output steam into a main steam header 15 for distribution to two or more steam turbines. One steam turbine 17 may be used solely for the production of a power output and therefore is coupled to a load 19. The load may be for example, a pump, a compressor, an electrical generator or other driven load. The turbine 17 includes a control circuit 21 which electronically positions inlet steam valve 23 through valve operator 25. The exact nature of the control circuit 21 is not pertinent to the present invention but it may include a speed feedback channel 27 for providing a speed feedback signal which is then compared with a set speed (not shown) to produce a speed error signal for valve adjustment. U.S. Pat. No. 3,986,788 to Rossi and assigned to the assignee of the present invention is one example of a speed control circuit.

A second turbine 31 is also connected in fluid communication to the main steam holder. The second turbine differs from the steam turbine 17 in that it is used to supply process steam 33. The turbine may also be connected to a driven load or an electrical generator 35. In the usual manner of operation disclosed in U.S. Pat. No. 2,977,768 to Wagner and Straney, a control system 37 is set up to position a throttle valve 39 and an extraction valve 41 through valve operators 43 and 45 respectively. The control system 37 receives inputs indicating actual turbine speed 47 and extraction pressure 49. Thus it is clear that each turbine includes its own control system capable of maintaining a desired set speed sufficient to meet the load requirements 19 and 35. A crisis occurs when there is insufficient steam in the main header 15 to meet both the load and process steam requirements of the power plant. The present invention is directed toward resolving that crisis in an orderly and predetermined manner of assigned control priorities in the extraction type turbine control. The insufficient steam flow may be sensed by a throttle pressure indicator (not shown) which inputs that message into the extraction turbine control system 37 along electrical connection line 51.

Figure 2:
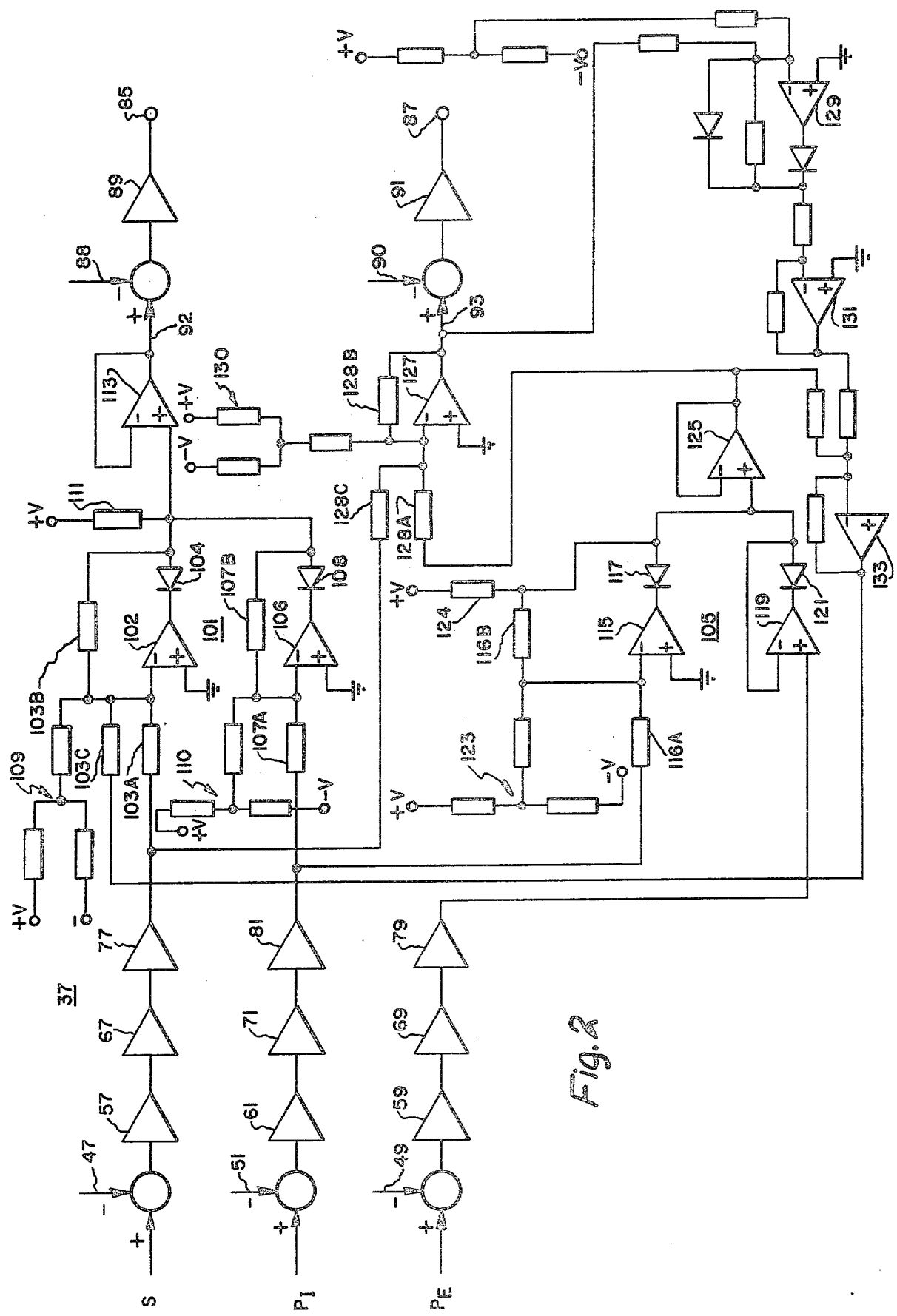
FIG. 2 is a schematic drawing of an electrical control according to a preferred embodiment of the present invention.

FIG. 2 discloses the control system 37 according to the present invention which may be used in combination with the extraction turbine 31. Power supplies and other electrical details obvious to the routineer in the art have been omitted to clarity. Control system 37 receives three inputs which relate to turbine speed(S); inlet pressure ($P_I$), and extraction pressure ($P_E$). Signal input 47 from FIG. 1 is proportional to actual turbine speed; signal input 49 (FIG. 1) is proportional to actual extraction pressure and signal input 51 from FIG. 1 is proportional to actual turbine inlet pressure. These signals are compared with set signals indicating desired speed, extraction pressure and inlet pressure, respectively indicated by positive arrows. Amplifiers, 57, 59 and 61 are comparator amplifiers with accept set point and feedback signals as shown, and generate respective output signals which are proportional to the difference between the set point and reference signals.

Amplifiers 67, 69 and 71 are integrating amplifiers whereas amplifiers 77, 79 and 81 are used for dynamic stability compensation. The latter circuitry compensates for system lead-lag by phase shift of line signals. Thus each signal output from amplifiers 77, 79 and 81 represent an error signal based on the particular physical condition monitored.

The control circuit 37 provides two output signals. The first output signal at terminal 85 is a throttle valve positioning signal. A second output signal at terminal 87 is an extraction valve positioning signal. Amplifiers 89 and 91 are servo amplifiers having inputs designating valve position feedbacks 88 and 90 respectively and valve position demands 92 and 93. Two low value gates 101 and 105 determine the valve position demands 92 and 93.

Low valve gate 101 is comprised of, in part, inverter amplifier 102, resistors 103 (A,B,C) and diode 104. The other half of low value gate 101 is comprised of inverter amplifier 106, resistors 107 (A,B) and diode 108. Bias circuitry is provided for amplifier circuit 102 by resistor group 109 whereas bias circuitry is provided for amplifier circuit 106 by resistor group 110. Resistor 111 provides a path for current to either amplifier 102 or 106 when either of these devices are conducting. Amplifier 113 represents a non-inverting unity gain amplifier whose input is obtained from low value gate 101. The output of low value gate 101 can be a signal proportional to speed and extraction pressure (S,$P_E$), or inlet pressure ($P_I$). The manner in which the low value gate operates is as follows. The signal which will be applied to the input of amplifier 113 will be either the output of amplifier 102 or the output of amplifier 106. If the output signal of amplifier 102 is more negative than the output signal of amplifier 106, diode 108 will be back biased and the output of amplifier 106 will be effectively disconnected from the input to amplifier 113. Thus the input to amplifier 113 will be the signal output from amplifier 102. In the event that amplifier 106 has an output which is more negative than the output of amplifier 102, then amplifier 106 will provide the signal to amplifier 113.

The second low value gate 105 is comprised of, in part, inverter amplifier 115, resistors 116 (A,B) and diode 117. The second part of this gate comprises amplifier 119 and diode 121. Resistor group 123 provides the bias circuitry for amplifier 115 whereas resistor 124 is comparable to resistor 111 in gate 101. The gating action of low value gate 105 is the same as the gating action described for low value gate 101.

Amplifier 125 represents a unity gain non-inverting amplifier. The input to this amplifier is proportional either to the inlet pressure $P_I$ error signal of the extraction pressure $P_E$ error signal.

Amplifier 127 with its associated resistors 128 (A,B,C) and bias group 130 is a summing amplifier having signal inputs comprising the speed S error signal and one of the pressure error signals which exist at the output of amplifier 125. The output of amplifier 127 provides the extraction valve lift set point signal 93.

The circuitry including amplifier 129 and its associated resistors and diodes; and, amplifier 131 along with its associated resistors provides a limit function which acts to override pressure error signals $P_E$ to the inlet valves and extraction valves in the event that the extraction valve goes fully closed. This is to avoid a situation where excessive extraction flow can result in excessive rotor speed. Whenever the extraction valves do go into the closed position, the resultant signal from amplifiers 129 and 131 passes through amplifier 133 where it adds to the speed signal input S into amplifier 102 through resistor 103a to reinforce the signal out of amplifier 102. Otherwise, when the extraction valves are open, the output of amplifiers 131 and 129 is zero.

OPERATION: SPEED/EXTRACTION PRESSURE CONTROL

When operating as a speed/extraction pressure control, it is assumed that the inlet pressure set point will be set at a throttle pressure level which corresponds to the minimum pressure which will be permitted to exist before the control system is required to switch from a speed/extraction pressure control mode to an inlet pressure/speed control mode. Inlet or throttle pressure will normally be higher than this set point. A pressure transducer (not shown) is included in the inlet line to sense throttle pressure and provide the inlet pressure feedback signal 51 as shown. When throttle pressure 51 is higher than the inlet pressure set point $P_I$, the throttle pressure circuitry 61, 71 and 81 will integrate to its full throttle flow limit which represents −5 volts at the output of amplifier 81. This will result in the output of amplifier 106 being at a +5 volts which is higher than the output of amplifier 102. Diode 108 will be back biased and will not conduct current. The output of low value gate 101 will then be proportional to the output of amplifier 102.

The extraction pressure control loop includes amplifiers 59, 69 and 79. The output of amplifier 79 is applied to amplifier 119 in low value gate 105. When operating in the speed/extraction pressure control mode, the inlet pressure signal $P_I$ which is applied to amplifier 115 in low value gate 105 will also result in the output of amplifier 115 being more positive than the output of amplifier 119. Thus the output of low value gate 105 will be a function of the extraction pressure control loop. The input to amplifier 125 will be the extraction pressure error signal $P_E$. The output of amplifier 125 is input into amplifier 127 where it is combined with the speed loop signal from amplifier 77. The output of amplifier 127 is now a function of speed and extraction pressure. The output of amplifier 125 also passes through amplifier 133 through its associated input resistor where it is summed at the input of amplifier 102 with the speed control loop signal. Since the output of amplifier 102 is providing the input for amplifiers 113, the inlet valve lift set point is also a function of speed and extraction pressure.

In the event that the extraction valves go closed during speed/extraction pressure control, the limiting circuitry of amplifiers 129 and 131 acts to cancel out the effect of the pressure control system on the positions of the inlet and extraction valves in the following manner. The output of amplifier 129 is normally at 0 volts when the extraction valves are not closed. In this case, the input to amplifier 133 is a function of the extraction pressure control loop as previously explained. In those cases where the extraction valve gear is closed, the output of amplifier 129 switches from 0 to a voltage which is proportional to the voltage developed at point 93. This voltage is inverted by amplifier 131 and is combined in amplifier 133 with the output of low value gate 105 which is proportional to extraction pressure. The gains of amplifiers 129 and 131 are set up such that the output of amplifier 125 is cancelled by the output of amplifier 131. The output of amplifier 133 does not change any further as a result of the extraction pressure and, therefore, the output of low value gate 101 now is a function of speed only. In this manner, the inlet valves are controlled by speed alone.

In normal operation, the net effect of the speed and pressure control loops on the valve positions is as follows. In the event that speed is to be increased or decreased while extraction pressure is maintained constant, both the inlet and extraction valve gear are moved in the same direction. In the event that a change in extraction flow causes a change in extraction pressure, the inlet and extraction valves will be moved in opposite directions. For example, a decrease in extraction flow will initially result in an increased extraction pressure. In order to restore extraction pressure and maintain turbine speed constant, the extraction valves will open to allow more flow to the back end of the machine and the inlet valves will close to reduce the amount of torque developed in the front section of the turbine to compensate for the increased torque developed across the back end of the turbine.

OPERATION: INLET PRESSURE/SPEED CONTROL

The purpose of the inlet pressure control is to assure that the throttle flow to the turbine is maintained at a level which does not drive the inlet pressure below the desired set point $P_I$. In the event that an external system malfunction occurs such that the inlet pressure begins to drop due to excessive throttle flow requirements, the system will automatically switch from a speed/extraction pressure control mode to an inlet pressure/speed control mode. The manner in which this is accomplished is as follows.

As the inlet pressure begins to drop, the changing inlet pressure will be detected by comparator amplifier 61. As the inlet pressure drops below the inlet pressure set point, a signal will be generated to integrating amplifier 71 which will drive the output of amplifier 106 in low value gate 101 more negative than the output of amplifier 102. At this point, the input to amplifier 113 will now become a function of the inlet pressure control system. The speed control loop will no longer be affecting the inlet valve lift set point 92. The output of the inlet pressure control loop $P_I$ which appears at amplifier 81 also results in the output of amplifier 115 becoming more negative than the output of amplifier 119. The output of low value gate 105 which appears at the output of amplifier 125 now will be a function of the inlet pressure control loop only. The output of amplifier 125 is summed at the input of amplifier 127 with a signal from the speed control loop. The output of amplifier 127 represents a combined signal from the speed and inlet pressure control loops and determines the extraction valve lift set point 93. The output of amplifier 125 also passes through amplifier 133, through resistor 103c and provides an input to amplifier 102. However, since amplifier 106 is the predominant amplifier in low value gate 101, this signal path does not affect the output of low value gate 101.

Since the control system can control only two parameters, operation in the Inlet Pressure/Speed Control mode will require that the extraction pressure be held constant by some other means whose steam source is other than that which supplies steam to the turbine inlet.

The automatic transition from a speed/extraction pressure control to an inlet pressure/speed control is accomplished by the actions of low value gates 101 and 105 as described above. The automatic transition from speed/extraction pressure control to inlet pressure/speed control will result if the inlet pressure drops below a preset level. Upon recovery of the inlet pressure to the minimum preset level, the control system will automatically revert back to a speed/extraction pressure control mode. It should be noted that there are basic differences in how the inlet and extraction valves are controlled in the speed/extraction pressure control system and the speed/inlet pressure control system. In the speed/extraction pressure control mode, the speed control circuitry positions both the inlet and the extraction valve gear in the same direction to change throttle flow and exhaust flow by the same amount in response to changes in required shaft horsepower without changing the extraction flow. Therefore, throttle and exhaust flows are changed as required. The pressure control system positions the inlet and the extraction valve gear in opposite directions in order to change power developed in the back end of the machine by the same amount but in an opposite sense to the change in head end power. This allows a change in extraction flow (the difference in throttle and exhaust flows) with no change in total shaft horsepower developed. In the speed/inlet pressure control system, the speed control circuitry positions only the extraction valve gear so that the shaft power may be changed without changing inlet throttle flow. The inlet pressure control circuitry positions the inlet and extraction valve gear in opposite directions in order to change power developed in the back end by the same amount but in the opposite sense as the change in power in the head end. This allows a change in throttle flow with no change in total shaft horsepower.

While there has been shown what is considered to be a preferred embodiment of the invention, it is also understood that other modifications may be made therein which may be obvious to one of ordinary skill in the art. It is intended to claim all such modifications as fall within the true spirit and scope of the invention.

What is claimed is:

1. A method for controlling the operation of an extraction steam turbine in accordance with a minimum inlet steam pressure; said extraction steam turbine including inlet valve means and extraction valve means; and, said method comprising the steps of:
   positioning said inlet valve means and said extraction valve means in accordance with speed and extraction pressure error signals whenever the inlet steam pressure exceeds the minimum inlet steam pressure;
   positioning said inlet valve means in accordance with an inlet pressure signal whenever the inlet steam pressure falls below the minimum inlet steam pressure; and,
   positioning said extraction valve means in accordance with an inlet pressure signal and a speed signal whenever the inlet steam pressure falls below the minimum inlet steam pressure.

2. A control system for controlling the operation of an extraction type steam turbine in accordance with a minimum inlet steam pressure; said extraction steam turbine including inlet valve means and extraction valve means; and, said control system comprising:
   means responsive to turbine rotor speed providing a speed error signal;
   means responsive to extraction steam pressure providing an extraction pressure error signal;
   means responsive to inlet steam pressure providing an inlet pressure error signal;
   first gating means between the speed error signal and the inlet pressure error signal;
   second gating means between the extraction pressure error signal and the inlet pressure error signal;
   inlet valve positioning means connected to the output of said first gating means;
   extraction valve positioning means connected to the output of said second gating means;
   means for combining said extraction pressure error signal with speed error signal electronically upstream from said first gating means; and,
   means for combining said speed error signal with the output of said second gating means.

3. The control system recited in claim 2 wherein the inlet pressure error signals predominate at each of the gating means whenever the inlet steam pressure is below the minimum inlet steam pressure.

4. The control system in accordance with claim 3 wherein the inlet valve control signal comprises the inlet pressure error signal.

5. The control system in accordance with claim 3 wherein the extraction valve control signal comprises the inlet pressure error signal and the speed error signal.

6. In an extraction type steam turbine having a steam valve and a steam extraction valve a control system for positioning said valves in accordance with a preselected minimum steam header pressure said control system comprising:
   means for generating a speed error signal;
   means for generating an extraction pressure error signal; said extraction pressure error signal normally combining with said speed error signal to provide a first inlet valve control signal; said speed error signal normally combining with said extraction pressure error signal to provide a first extraction valve control signal;
   means for generating an inlet pressure error signal;
   a first signal gate receiving said speed error signal and said inlet pressure error signal;
   a second signal gate receiving said extraction pressure error signal and said inlet pressure error signal; said first and second signal gates passing said inlet pressure error signal through whenever the inlet pressure falls below the preselected minimum steam header pressure; and,
   said speed error signal added to the output of said second gate whereby whenever the inlet pressure falls below a preselected minimum inlet pressure the steam inlet valve is positioned in accordance with inlet pressure error signal and said extraction valve is positioned in accordance with the inlet pressure error signal and the speed error signal.

* * * * *